US008696032B2

(12) United States Patent
Whiteman

(10) Patent No.: US 8,696,032 B2

(45) Date of Patent: Apr. 15, 2014

(54) SECURITY DEVICE

(75) Inventor: Robert Whiteman, Southampton (GB)

(73) Assignee: De La Rue International Limited, Hampshire (GB)

( * ) Notice: Subject to any disclaimer, the term of this patent is extended or adjusted under 35 U.S.C. 154(b) by 1115 days.

(21) Appl. No.: 12/308,175

(22) PCT Filed: Jul. 3, 2007

(86) PCT No.: PCT/GB2007/002475

§ 371 (c)(1), (2), (4) Date: Jan. 2, 2009

(87) PCT Pub. No.: WO2008/003949

PCT Pub. Date: Jan. 10, 2008

(65) Prior Publication Data

US 2009/0244519 A1 Oct. 1, 2009

(30) Foreign Application Priority Data

Jul. 4, 2006 (GB) .................................. 0613306.0

(51) Int. Cl.
*B42D 15/00* (2006.01)
*G02B 5/18* (2006.01)

(52) U.S. Cl.
USPC ................ 283/72; 283/91; 359/574; 359/575

(58) Field of Classification Search
USPC ....................... 283/72, 91, 110; 359/374, 375
See application file for complete search history.

(56) References Cited

U.S. PATENT DOCUMENTS 4,304,809 A 12/1981 Moraw et al.
4,652,015 A 3/1987 Crane (Continued)

FOREIGN PATENT DOCUMENTS

DE 4334847 A1 4/1995
DE 102004014778 A1 10/2005

(Continued)

OTHER PUBLICATIONS

M.T. Gale, "Sinusoidal Relief Gratings for Zero-Order Reconstruction of Black-And-White Images", Aug. 1976, pp. 292-297, vol. 18 No. 3, *Optics Communications*.

(Continued)

*Primary Examiner* — Kyle Grabowski

(74) *Attorney, Agent, or Firm* — Oliff PLC

(57) ABSTRACT

A security device comprises a substrate having a transparent region (1). At least one optical element (2, 3) is provided in part of the transparent region, the optical element causing an incident off-axis light beam transmitted through the optical element to be redirected away from a line parallel with the incident light beam whereby when the device is viewed in transmission directly against a backlight, the presence of the optical element cannot be discerned but when the device is moved relative to the backlight such that lines of sight from the viewer to the transparent region and from the transparent region to the backlight form an obtuse angle (α) at which redirected light is visible to the viewer, a contrast is viewed between the part of the transparent region including the optical element and another part of the transparent region. When the security device is viewed in reflection under diffuse lighting conditions either no contrast can be discerned between the two parts or a different contrast can be discerned between the two parts.

31 Claims, 8 Drawing Sheets

(56) References Cited

U.S. PATENT DOCUMENTS

| | | | | |
|---|---|---|---|---|
| 5,032,003 | A * | 7/1991 | Antes | 283/91 |
| 5,912,767 | A * | 6/1999 | Lee | 283/91 |
| 5,915,731 | A * | 6/1999 | Jackson | 283/91 |
| 6,428,051 | B1 | 8/2002 | Herrmann et al. | |
| 6,749,925 | B2 * | 6/2004 | Hoppe et al. | 283/72 |
| 7,215,450 | B2 * | 5/2007 | Schilling et al. | 283/91 |
| 7,738,173 | B2 * | 6/2010 | Schilling et al. | 359/573 |
| 7,777,953 | B2 * | 8/2010 | Kaule | 359/566 |
| 2007/0020530 | A1 * | 1/2007 | Zientek et al. | 283/91 |
| 2008/0036197 | A1 | 2/2008 | Brehm et al. | |
| 2008/0259456 | A1 | 10/2008 | Schilling et al. | |

FOREIGN PATENT DOCUMENTS

| | | | |
|---|---|---|---|
| EP | 0012375 | A2 | 6/1980 |
| EP | 0 201 323 | A2 | 11/1986 |
| JP | A-2001-315472 | | 11/2001 |
| WO | WO 83/00659 | A1 | 3/1983 |
| WO | WO 95/10419 | A1 | 4/1995 |
| WO | WO 95/10420 | A1 | 4/1995 |
| WO | WO 99/37488 | A1 | 7/1999 |
| WO | WO 00/18591 | A1 | 4/2000 |
| WO | WO 00/39391 | A1 | 7/2000 |
| WO | WO 01/00418 | A1 | 1/2001 |
| WO | WO 01/02192 | A1 | 1/2001 |
| WO | WO 03/006261 | A1 | 1/2003 |
| WO | WO 03/054297 | A2 | 7/2003 |
| WO | WO 2004/030928 | A1 | 4/2004 |
| WO | WO 2006/133863 | A2 | 12/2006 |

OTHER PUBLICATIONS

Gerthsen et al., “Physik”, 1986, p. 494 (with English translation).

E. Grimsehl et al., “Grimsehl Lehrbuch der Physik”, 1988, pp. 27 and 112 (with English translation).

* cited by examiner

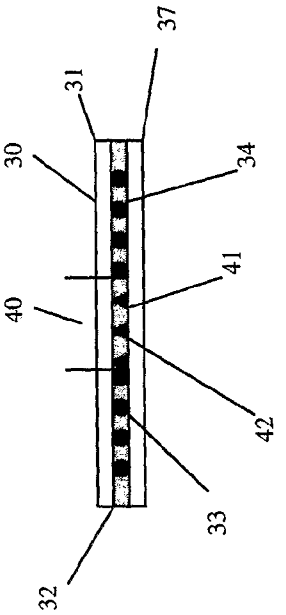
Figure 9a
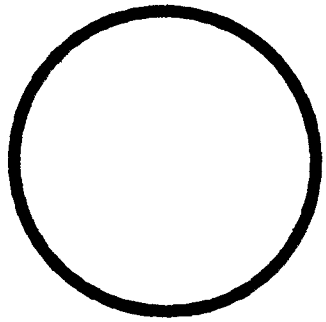
Figure 9b
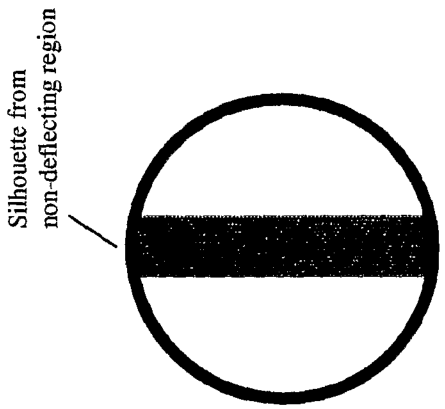
Figure 9c
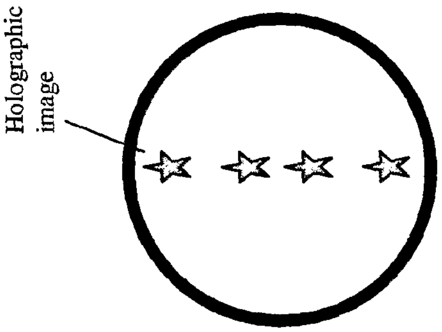
Figure 9d
Figure 9

SECURITY DEVICE

The invention relates to a security device and to a security document provided with such a security device.

A variety of security devices have been proposed in the past to prevent security documents from being counterfeited or fraudulently produced. A particularly useful security device is one which is readily verifiable by a user but which is difficult to produce. One example of such a security device is a clear transparent region in an otherwise opaque substrate. The use of a clear transparent region prevents the generation of a "simple" counterfeit arising from the increasing popularity of colour photocopiers and other imaging systems and the improving technical quality of colour photocopies. In addition the clear transparent region provides a feature that is easily verifiable by the general public. However a clear transparent region in an opaque substrate is susceptible to counterfeiting, for example by punching a hole in an opaque substrate and then placing a clear transparent polymeric film over the hole.

In the prior art this problem has been addressed by the use of additional optically variable security devices in the clear transparent regions. There are numerous examples in the prior art of applying a reflection-based diffractive device in the window of a banknote. For example U.S. Pat. No. 6,428,051 discloses the use of a diffractive device combined with a reflective metallised layer. However in such devices the image is visible in reflected light and distracts the eye from verifying the presence of a clear transparent region.

WO-A-99/37488 describes the use of a diffractive optical element in a clear transparent region, such that when collimated light passes through the diffractive optical element it is transformed by the diffractive structure into a recognisable pattern by the process of diffraction. The requirement for a collimated light source means that this feature is not easily verifiable by the general public and it is more appropriate for verification by bank tellers and retail staff with appropriate equipment and training.

Another example of a known security device is described in WO-A-01/02192. In this case, first and second diffractive structures or gratings are formed in respective first and second zones of a transparent window. The diffractive structures are chosen to diffract particular wavelengths of light outside of the users field of view leaving selected wavelengths within the users field of view, the wavelengths within the field of view producing visually discernible colours which together form a projected security image. In this device the projected security image, defined by the diffracted light, is visible at most common angles of view when the device is viewed in transmission.

In accordance with the present invention, we provide a security device comprising a substrate having a transparent region, wherein at least one optical element is provided in part of the transparent region, the optical element causing an incident off-axis light beam transmitted through the optical element to be redirected away from a line parallel with the incident light beam whereby when the device is viewed in transmission directly against a backlight, the presence of the optical element cannot be discerned but when the device is moved relative to the backlight such that lines of sight from the viewer to the transparent region and from the transparent region to the backlight form an obtuse angle at which redirected light is visible to the viewer, a contrast is viewed between the part of the transparent region including the optical element and another part of the transparent region, and wherein when the security device is viewed in reflection under diffuse lighting conditions either no contrast can be discerned between the two parts or a different contrast can be discerned between the two parts.

The invention provides an improved security device in a clear transparent region that is simple to verify when viewed in transmitted light. The security device of the current invention uses one or more optical elements to create an apparent silhouette of an opaque image in an optically transmissive region, typically incorporated into a secure document. The apparent silhouette of the image appears in the plane of the transparent region when viewed under particular conditions. The security device is optically variable in the sense that when it is viewed in diffuse light, or directly backlit by a source that is aligned with the device and the observer, the image is essentially invisible, and the window appears transparent and featureless. However, when the backlit transparent region is viewed such that it forms the appropriate range of obtuse angles between the viewer and the light source the apparent silhouette of the image appears. A further important aspect of this security device is that the image cannot be detected when the device is viewed under reflected light. The fact that the image is not viewed in reflection under diffuse lighting conditions further increases the security of the device by making it impossible to mimic the silhouette of the image using conventional printing techniques which by their nature are visible in reflection and transmission.

In contrast to the device of WO-A-01/02192 there is an intentional optically variable effect and there is interaction between the user and the device to reveal the security image. One advantage of the security device according to the invention is that the method of authentication, which uses a simple interaction between the user and the device, makes the device easily recognisable and memorable to the user and therefore increases its counterfeit resistance.

The optical element(s) can take a variety of forms. In the most preferred examples, the optical element is substantially transparent and may comprise a diffraction grating. This is convenient because diffraction gratings have a first order component at a sufficiently large angle to the zero order to maximise the contrast effect. Preferably a diffraction grating is chosen such that the middle of the range of obtuse angles $\alpha$ between the viewer and the light source for the redirected diffracted beam is less than 180° but greater than 90° and more preferably in the range 130-175° and even more preferably in the range 150-170°. The degree of diffraction will depend on the wavelength of the incident beam and therefore for a polychromatic light source the redirected light will be spread over an angular range where the redirected red light defines the upper end of the range of obtuse angles between the viewer and the light source and the redirected blue light defines the lower end. Preferably a diffraction grating is chosen such that the angular spread of the diffracted light is up to 60° and more preferably between 1-25° and even more preferably between 5-15°. In order to achieve the diffractive conditions defined above a linear grating can be employed with a line density in the range 200-1500 lines/mm and more preferably in the range 250-1000 lines/mm and even more preferably in the range 300-700 lines/mm.

In another example, the or each optical element is formed by a set of spaced prismatic elements.

In this case, each of a first set of elements will typically have opposed sets of facets, one set of the facets being reflective to visible light and the opposed set of facets being absorbent to visible light. Typically, the device will further include a set of spaced prismatic elements with opposed opaque facets.

The contrast between the two parts which is observed can be designed in a variety of ways. For example, a simple geometric or graphical shape could be used but in the preferred examples, a recognisable image is defined such as pictorial images, patterns, symbols and alphanumeric characters and combinations thereof. Possible characters include those from non-Roman scripts of which examples include but are not limited to, Chinese, Japanese, Sanskrit and Arabic. It should be understood that the shape of the image may be defined by the optical element itself when one such element is provided or by the "another part" of the transparent region, typically defined between two or more optical elements.

In certain preferred examples, the security device further comprises a printed or metallised permanent image on the transparent region. The permanent image may take any form but typical examples include patterns, symbols and alphanumeric characters and combinations thereof. The permanent image can be defined by patterns comprising solid or discontinuous regions which may include for example line patterns, fine filigree line patterns, dot structures and geometric patterns. Possible characters include those from non-Roman scripts of which examples include but are not limited to, Chinese, Japanese, Sanskrit and Arabic. The radiation used for viewing the indicia would typically be in the visible light range but could include radiation outside the visible range such as infrared or ultraviolet. For additional security, this permanent image may cooperate with a recognisable image formed by the said contrast.

In an alternative embodiment the security device further comprises a reflective based optically variable device such as a hologram or diffraction grating. These devices are commonly formed as relief structures in a substrate, which is then provided with a reflective coating to enhance the replay of the device. The reflective based optically variable device is part of the transparent region and in order to maintain the transparency of the security device the reflective coating is provided by a reflection enhancing material which is substantially transparent. Suitable transparent reflection enhancing materials include high refractive index layers for example ZnS. Further suitable transparent reflection enhancing materials are referred to in EP201323.

The reflective based optically variable device is optimized for operation in reflection. This is in contrast to the diffraction grating use to form the optical element which is optimized for operation in transmission. An important distinction between reflection and transmission diffractive microstructures (diffraction gratings, holograms, etc) is the depth at which optimum diffraction efficiency is achieved. For a reflection structure the optimum embossing depth is approximately equal to the optical wavelength divided by 3n, where n if the refractive index. Whereas, for a transmission structure there is a (n/(n−1)) multiplier which results in a peak efficiency at embossing depths that are typically three times deeper than that for a reflective structure. Thus when a diffractive structure is optimised for high reflection efficiency it's diffractive efficiency in transmission is necessarily poor.

Typically, the or each optical element is embossed into the substrate or into an embossing lacquer applied to the substrate although the invention is equally applicable to optical elements which have been adhered to a transparent substrate such as via a transfer process or the like.

In most cases, the backlight will be formed by a light source located behind the device. However, the backlight could be formed by a reflector, such as a white surface.

Security devices according to the invention can be used to secure a wide variety of articles but are particularly suitable for inclusion in a security document. In that case, the security device could be adhered to the document but preferably the substrate of the security document provides the substrate of the security device.

In the case of security documents, the recognisable image produced by the contrast may relate to an image found elsewhere on the security document.

Some examples of security devices and security documents according to the invention will now be described with reference to the accompanying drawings, in which:—

FIGS. 8-10 illustrate examples of security devices also comprising a reflective diffractive device; and, FIG. 11 illustrates a security device also comprising a reflective diffractive device and a permanent metallised image.

Figures 1, 1A, 1B:
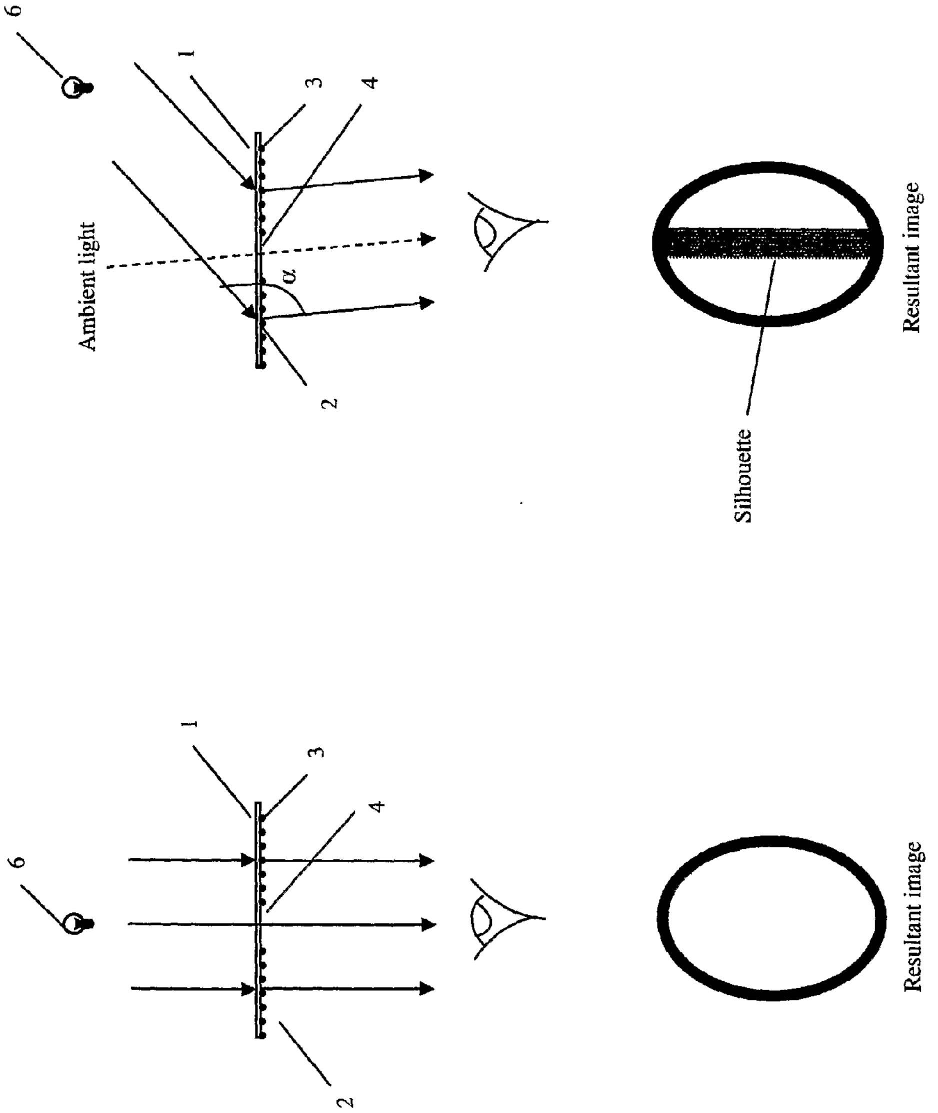
FIGS. 1A and 1B illustrate schematically a first example of a security device according to the invention when viewed in two different ways and illustrating the appearance of the device in each case.

A first example of a security device according to the invention is shown in FIGS. 1A and 1B. This device comprises a transparent region 1 of a substrate into respective, spaced parts of which have been embossed optical elements 2,3. An unembossed part 4 is located between the optical elements 2,3. In this case, the unembossed part 4 defines an image under certain viewing conditions.

When the device is directly backlit, such that a light source 6, which is of higher intensity than the ambient light level is in-line with the device and the observer, the intensity of the transmitted light through both the optical elements 2,3 and the non-deflecting region(s) 4 appears substantially the same to the viewer such that the transparent region appears substantially transparent and featureless (see resultant image in FIG. 1*a*).

When the device is panned away from the light source 6 (FIG. 1B), such that the observer is no longer viewing the device in the direction of the light source 6, a range of viewing angles (a) are achieved at which the optical elements 2,3 redirect light from the source 6 back towards the observer resulting in the areas that contain the optical elements appearing brightly illuminated. In contrast, in the non-deflecting regions 4, the light is not redirected, and the observer simply sees ambient light transmitted through the clear transparent region 4. For a wide range of viewing angles and backlight conditions, the contrast between the redirected light and the ambient light gives the impression that there is a real obstruction in the transparent region 4. In this example the silhouette is in the shape of a traditional elongate banknote security thread. The obstruction is observed in the transparent region as a silhouette in the form of the image defined by the non-deflecting region(s) 4 (see resultant image in FIG. 1*b*). The observer authenticates the feature by holding the note up to a backlight and panning from side to side away from the light source. This then alternately generates and hides the apparent image.

The optical elements 2,3 should be capable of efficiently bending or redirecting light to viewing angles off-axis (i.e. the incident light does not impinge on the device in a direction perpendicular to the plane of the device), whilst allowing (at least partial) direct transmission when the source, observer and device are directly aligned. In a preferred (but not sole)

embodiment the optical elements are linear diffraction gratings. If the gratings 2,3 are formed in or transferred to the transparent substrate 1 then they will appear essentially transparent when held directly to the light, however when moved from side to side, such that the observer is positioned in the first order diffraction region, light from the source 6 will be diffracted towards the viewer at an angle dictated by the wavelength. This wavelength dependence thus gives a further enhancement to the feature described in FIG. 1 whereby the silhouette of the image is consequently seen to be backlit by a changing array of colours when the viewing position is varied. It can be seen that as the device is moved a range of obtuse angles $\alpha$ is subtended between the viewer and the source 6 at the non-deflecting region 4. As explained above, $\alpha$ varies between 90° and 180°, preferably 130-175°, most preferably 150-170°. When viewed in reflection under diffuse conditions the reflected light from the diffractive and non-diffractive regions is of a similar intensity because firstly the diffraction gratings are optimised for transmitted light and therefore the efficiency of the reflective diffractive component is low and secondly any residual non-zero (reflected) orders are continuously distributed and superimposed.

Figure 2:
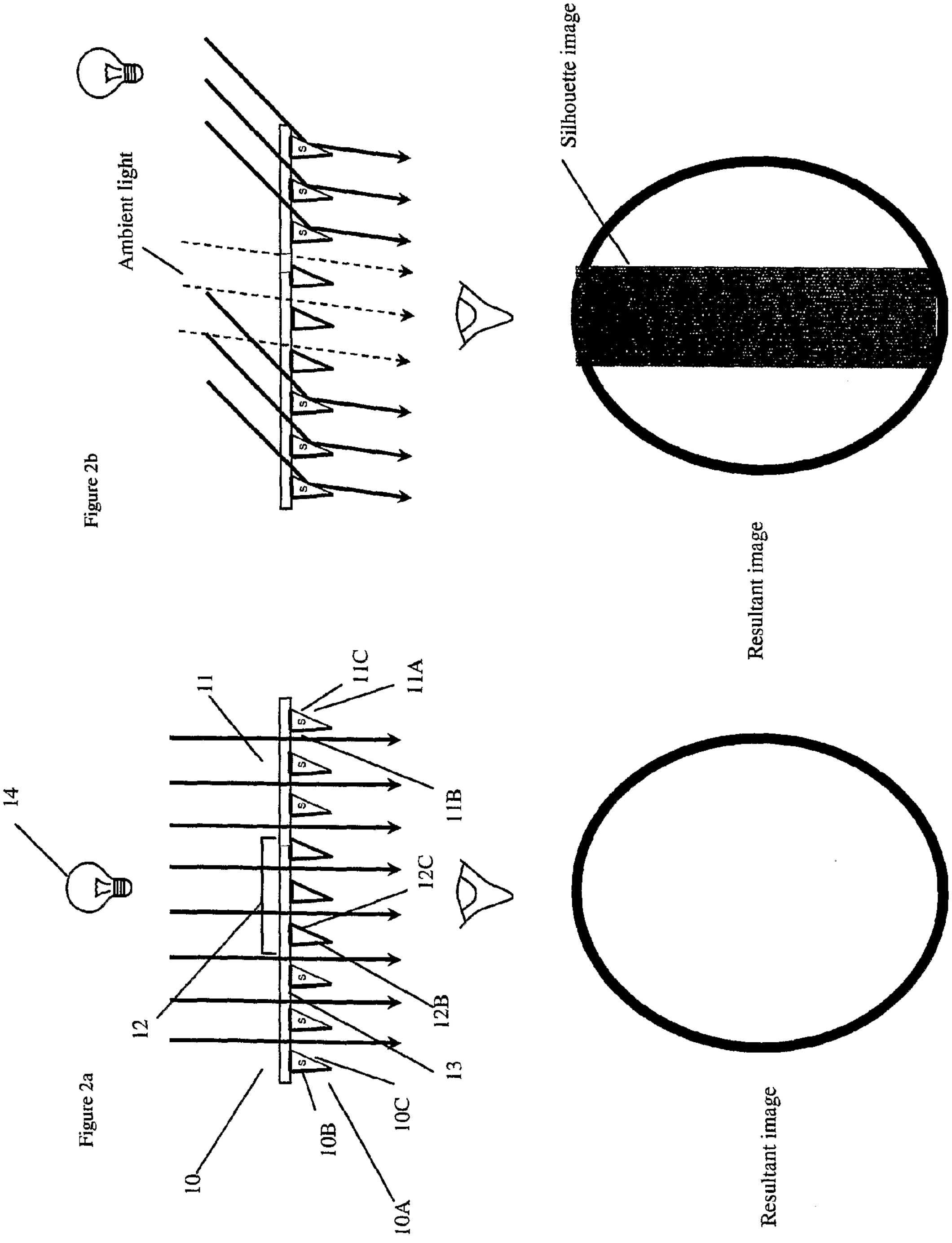
FIGS. 2A and 2B are similar to FIGS. 1A and 1B respectively but of a second example.

A second example of a security device according to the invention is shown in FIGS. 2A and 2B. The device comprises a transparent region of a substrate into respective, spaced parts of which have been replicated deflecting optical elements 10,11 comprising an array of linear prisms 10A,11A respectively, the individual prisms being spaced apart so as to define planar parts 13 between them.

Each prism 10A and 11A has a pair of opposed facets 10B,10C; 11B, 11C. Corresponding facets 10B,11B; 10C, 11C are parallel.

The facets 10B and 11B are provided with a black, fully light absorbent coating. The facets 10C and 11C are formed with a reflective coating such as a preferential metallization of for example aluminium.

A non-deflecting 11 prismatic structure 12, comprising an array of prisms 12A, is located between the optical elements 10 and 11 and defines an image under certain viewing conditions. As with optical elements 10 and 11 the individual prisms are spaced apart so as to define planar parts 13 between them. Each prism 12A has a pair of opposed facets 12B and 12C. The facets 12B and 12C are provided with a black, fully light absorbent coating.

When viewed in reflection, the device will present a substantially uniform appearance as the light incident on the prisms 10A, 11A and 12A will either be absorbed by the black coating on the facets 12B or 12C or be reflected by the reflective facets 10C and 11C onto the opposed black coating on facets 10B and 11B respectively. Light incident on the regions 13 will simply pass through to the underlying background. The width (x) of the linear prisms 10A, 11A and 12A and the planar regions 13 are such that they cannot be resolved with the naked eye and therefore provides a uniform appearance in reflection. Typical dimensions for the width of the linear prisms and the width of the planar regions are in the range 25-200 microns and more preferably in the range 50-100 microns.

When the device is directly backlit and viewed in transmission such that the observer, security device and backlight 14 are aligned (FIG. 2*a*), both the deflecting optical elements 10,11 and the non-deflecting optical element 12 allow partial transmission of the light through the planar transparent regions 13. The individual prisms 10A, 11A and 12A absorb light for the same reasons as described for the device in reflective mode. The small non-resolvable size of the individual prisms 10A, 11A and 12A and the planar regions 13 result in the device appearing uniformly translucent (see resultant image in FIG. 2*a*). When the device is viewed away from the light source such that the observer is no longer viewing the device in the direction of the light source 14 an appropriate viewing angle $\alpha$ is reached where light is redirected by the reflective facets 10C and 11C (FIG. 2*b*). In contrast in the non-deflecting prismatic structure 12, where the reflective surfaces are absent, the light is not redirected, and the observer simply sees ambient light partially transmitted through the prismatic structure 12. The contrast between the deflecting and non-deflecting regions results in a silhouette of the image appearing in the non-deflecting regions 12 (see resultant image in FIG. 2*b*). In this example the silhouette is in the shape of a traditional elongate banknote security thread.

Examples of security documents with which the present invention can be used include banknotes, fiscal stamps, cheques, postal stamps, certificates of authenticity, articles used for brand protection, bonds, payment vouchers, and the like.

The security document (or security device) may have a substrate formed from any conventional material including paper and polymer. Techniques are known in the art for forming transparent regions in each of these types of substrate. For example, WO-A-8300659 describes a polymer banknote formed from a transparent substrate comprising an opacifying coating on both sides of the substrate. The opacifying coating is omitted in localised regions on both sides of the substrate to form a transparent region.

WO-A-0039391 describes a method of making a transparent region in a paper substrate in which one side of a transparent elongate impermeable strip is wholly exposed at one surface of a paper substrate in which it is partially embedded, and partially exposed in apertures at the other surface of the substrate. The apertures formed in the paper can be used as the first transparent region in the current invention.

Other methods for forming transparent regions in paper substrates are described in EP-A-723501, EP-A-724519 and WO-A-03054297.

There is no limitation on the image defined by the non-deflecting regions, and the examples discussed below are not intended to limit the invention.

Figure 3:
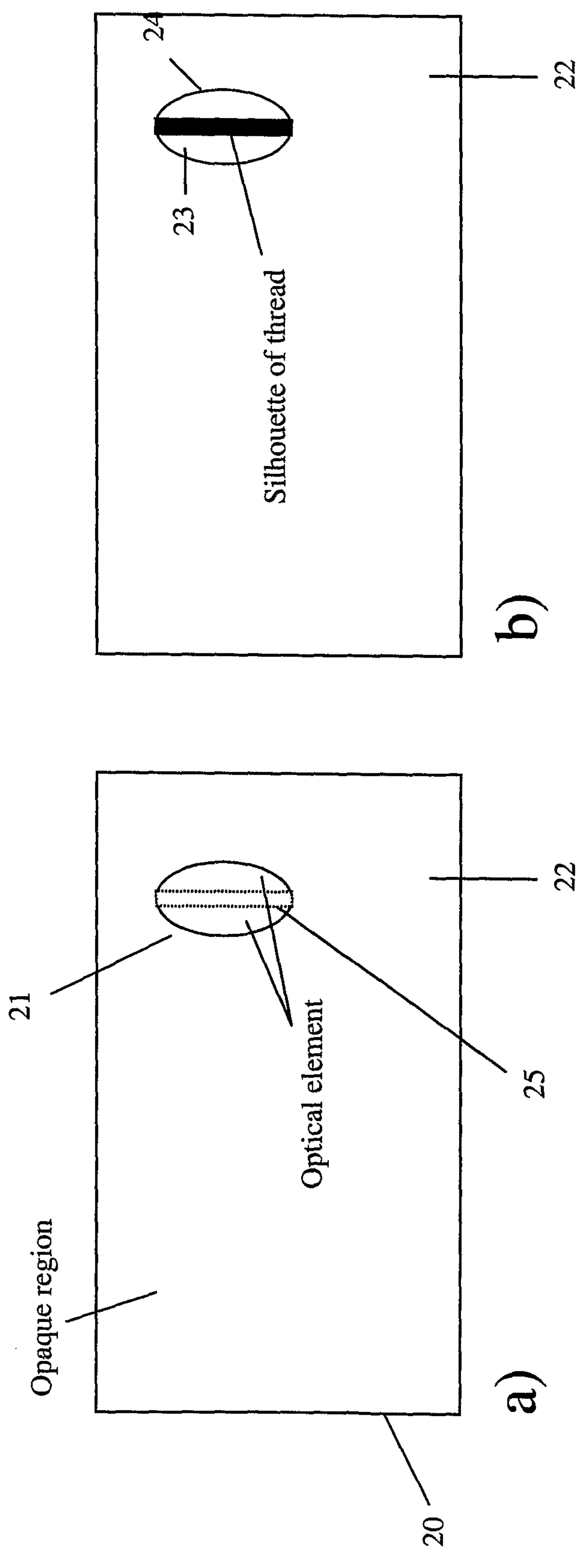
FIGS. 3A and 3B illustrate a security document incorporating a first example of the security device when viewed under different conditions.

FIG. 3 illustrates one example of a security document such as a banknote 20. A transparent region 21 is formed in an opaque substrate 22. Two optical elements 23,24, in the form of diffraction gratings, are present in the left and right portions of the transparent region 21, separated by a non-deflecting optically transparent region 25. Each diffraction grating 23,24 is such that it exhibits straight through (zeroth order) transmission and generates spectrally well spread first order diffraction regions that occur at a sufficient angular displacement to generate a high level of contrast between the ambient light level and the diffracted rays. The non-deflecting region 25 defines the image and is in the shape of a traditional elongate banknote security thread. Viewed in transmission when the light source, transparent region 21 and the observer are in alignment, the transparent region 21 appears uniformly transparent and the image is hidden (FIG. 3A). When the substrate 22 is panned away from the light source the regions of the transparent region that contain the diffractive optical elements 23,24 appear brightly illuminated but in contrast the non-deflecting region 25, transmitting ambient light, appears dark and the silhouette of the thread is revealed (FIG. 3B).

Figure 4:
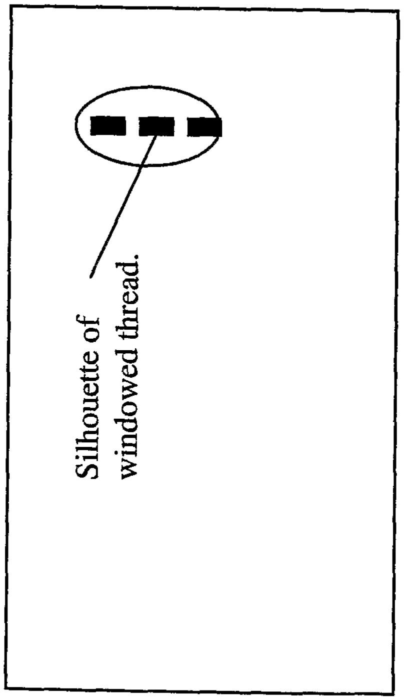
FIGS. 4 to 7 illustrate four further examples of security documents.
Figure 5:
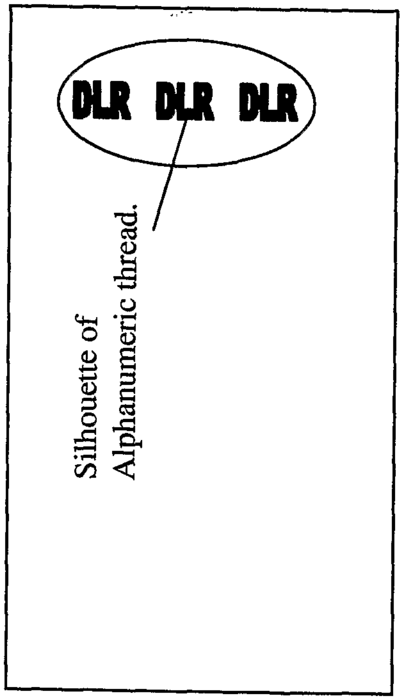

The optical elements and non-deflecting regions can be arranged such that the image appears as a traditional elongate banknote windowed thread, as illustrated in FIG. 4. Alternatively a series of alphanumeric images could be defined along the transparent region, again if desired to give the impression of a security thread, as illustrated in FIG. 5.

Figure 6:
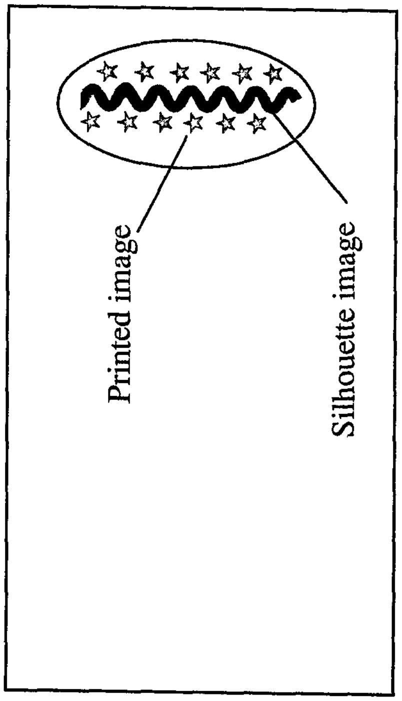

In a further example shown in FIG. 6 the transparent region comprises a printed image, in the form of an array of stars, that combines with a silhouette image, in the form of a wavy line, to form a further complete image. On holding the substrate up to a backlight and panning from side to side the observer will observe a permanent printed image and the appearance and disappearance of a second image formed by the combination of the permanent printed image and the silhouette. The permanent image could be printed using lithography, UV cured lithography, intaglio, letterpress, flexographic printing, gravure printing or screen printing. Alternatively the permanent image can be created using known metallisation or demetallisation processes.

Figure 7:
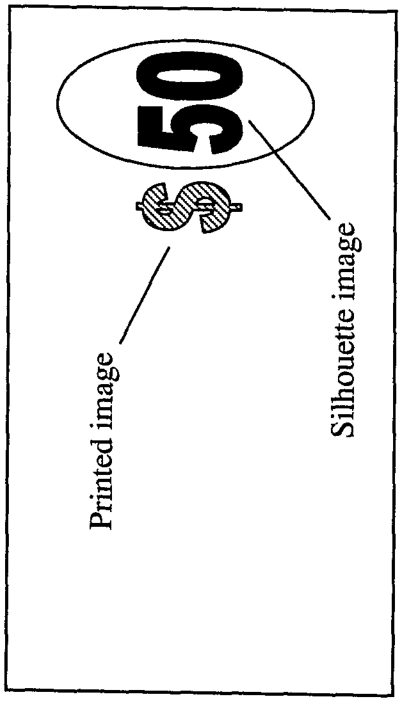

In a further example the silhouette image is linked to the image printed on the secure substrate. FIG. 7 illustrates an example where the image printed on the note is completed by the silhouette image, thereby providing a clear link between the transparent region and the secure document it is protecting.

FIGS. 8A, 8B and 8C illustrate a further example in which the security device also comprises a reflective diffractive device, which in this example is in the form of a hologram which replays in reflected light as an array of stars. The device, illustrated in cross-section in FIG. 8*a*, comprises a transparent region 30 of a substrate 31 on to which has been applied an embossing lacquer 32 into respective, spaced parts of which have been embossed two optical elements 33,34, in the form of diffraction gratings, separated by an unembossed non-deflecting optically transparent region 35. The diffraction grating for the optical elements 33,34 is such that it exhibits straight through (zeroth order) transmission and generates spectrally well spread first order diffraction regions that occur at a sufficient angular displacement to generate a high level of contrast between the ambient light level and the diffracted rays. A holographic structure 36 optimised for operation in reflected light is embossed into the embossing lacquer along both edges of the transparent region. A high refractive index layer 37, for example vapour deposited ZnS, is applied over the embossing lacquer such that it covers the whole of the transparent region. Alternatively the high refractive index layer could be applied solely over the holographic embossing.

The reflective diffractive device is optimised for reflective light and therefore its diffraction efficiency in transmission is poor such that in transmitted light it acts as a further non-deflecting region. When the light source, transparent region and the observer are in alignment the holographically embossed region, the diffractive optical elements 33,34 and the unembossed region 35 appear uniformly transparent. (FIG. 8B). When the substrate is panned away from the light source the regions of the transparent region that contain the diffractive optical elements 33,34 appear brightly illuminated but in contrast the unembossed region 35 and the holographically embossed regions 36, both acting as non-deflecting regions and transmitting ambient light, appear dark revealing the silhouette of a central thread and the silhouette defining an outline of the holographic image array (FIG. 8C). When the substrate is viewed in reflection the silhouette image generated by the non-deflecting region 35 disappears but the holographic image becomes readily apparent, due to the presence of the high refractive index reflection enhancing layer 37, and the hologram 36 replays as an array of stars along both edges of the transparent region (FIG. 8D).

Figure 8:
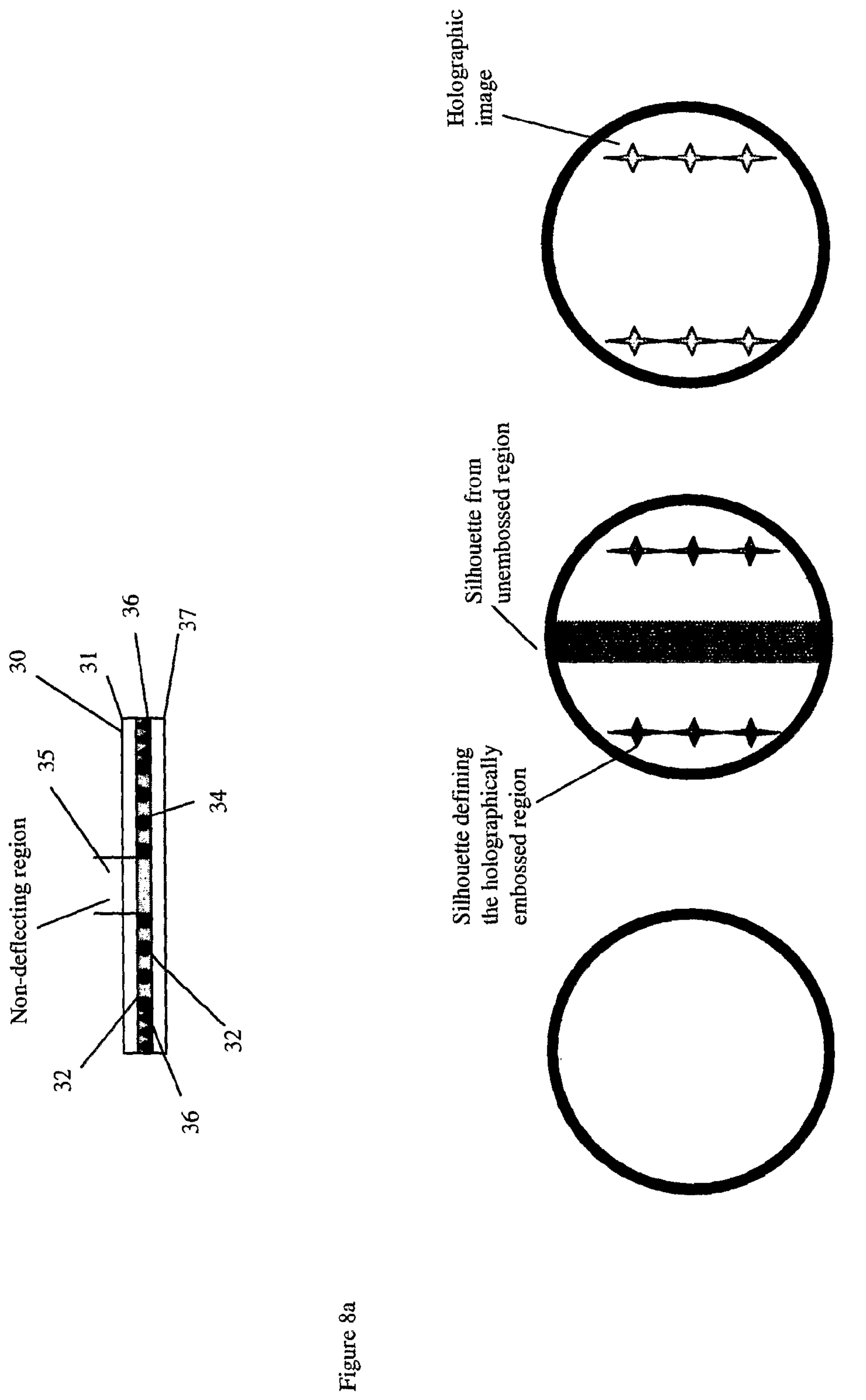

The security device illustrated in FIG. 8 couples the advantage of maintaining a completely transparent region when directly backlit with the additional security of displaying a different optically variable image when viewed in transmitted and reflected light.

FIGS. 9A-9D illustrate a further example of a security device similar to FIG. 8 but in which the sole non-deflecting region 40 is formed from a combination of unembossed and holographically embossed areas 41,42. The device, illustrated in cross-section in FIG. 9A, comprises a transparent region 30 of a substrate 31 on to which has been applied an embossing lacquer 32 into respective, spaced parts of which have been embossed two optical elements 33,34, in the form of diffraction gratings, separated by the non-deflecting region 40 which is substantially non-deflecting to transmitted light. The diffraction grating for the optical elements is as described for FIG. 8. The non-deflecting region 40 defines the image and is in the shape of a traditional elongate banknote security thread. As with the example in FIG. 8 the holographic structure 42 is optimised for operation in reflected light.

When the light source, transparent region and the observer are in alignment the non-deflecting region 40 and the diffractive optical elements 33,34 appear uniformly transparent (FIG. 9B). When the substrate is panned away from the light source the transparent regions that contain the diffractive optical elements 33,34 appear brightly illuminated but in contrast the unembossed region 40 and the holographically embossed region 41, both acting as non-deflecting regions and transmitting ambient light, appear dark and the silhouette of a central thread is revealed (FIG. 9C). The holographic image is not apparent in transmitted light due to the negligible contrast between the unembossed and holographically embossed regions but in reflection the silhouette image of the thread disappears to reveal a hologram replaying as a line of stars down the centre of the transparent region (FIG. 9D).

FIGS. 10A-10D illustrate a further example of the security device of the current invention in which an additional reflective diffractive device in the form of a hologram is incorporated. The device, illustrated in cross-section in FIG. 10A, comprises a transparent region 30 of a substrate 31 on to one side of which has been applied an embossing lacquer 32 into respective, spaced parts of which have been embossed two optical elements 33,34, in the form of diffraction gratings, separated by a unembossed non-deflecting optically transparent region 40. The diffraction grating for the optical elements is as described for FIG. 8. The non-deflecting region 40 defines the image and is in the shape of a traditional elongate banknote security thread. A second layer 50 of embossing lacquer is applied to the opposite side of the transparent substrate 31 and a holographic structure 51, optimised for operation in reflected light, is embossed into the embossing lacquer such that it covers the majority of the transparent region. A high refractive index layer 37, for example vapour deposited ZnS, is applied over the second layer of embossing lacquer such that it covers the whole of the transparent region.

Figures 10, 10A, 10B, 10C, 10D:
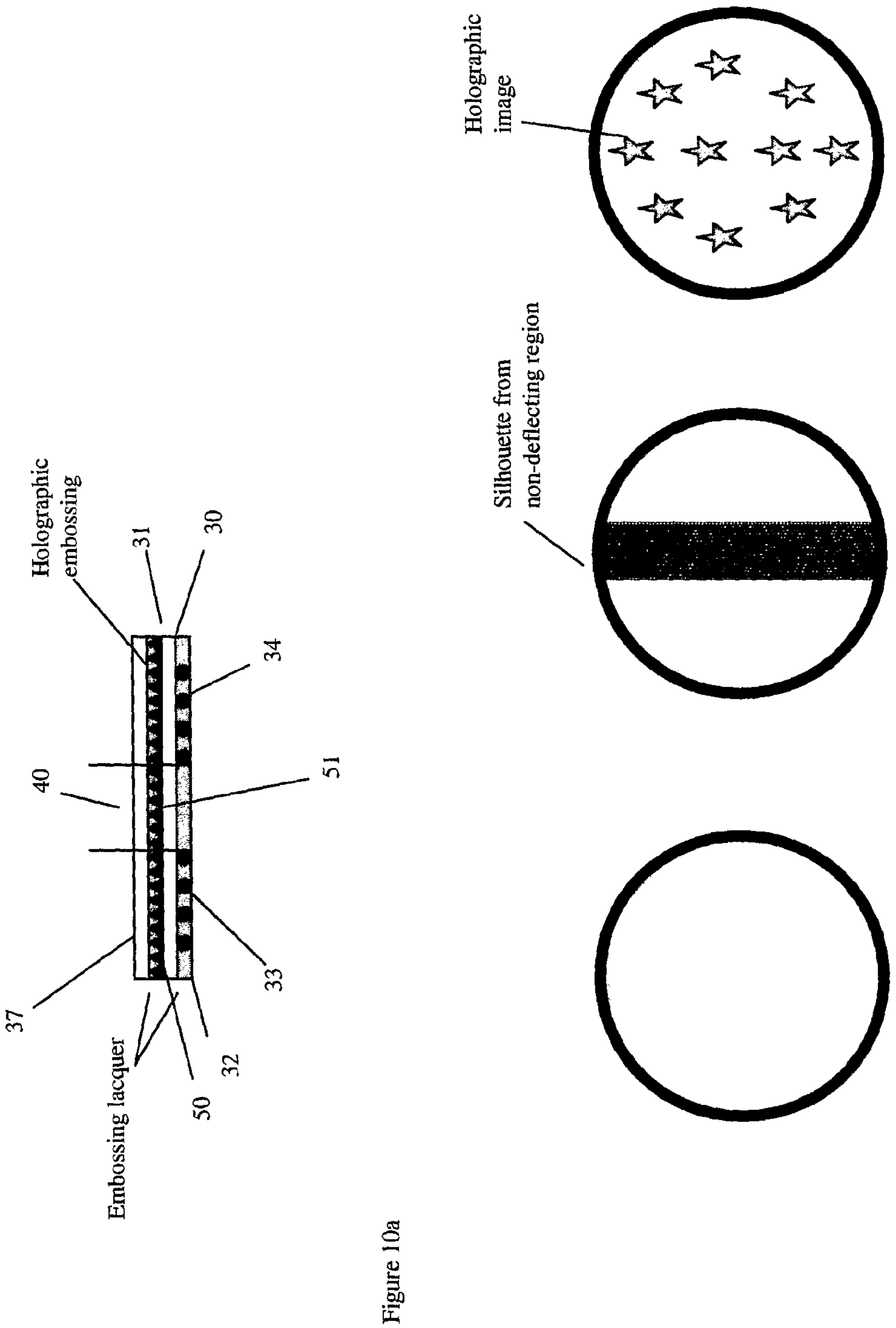

When viewed in transmitted light, with the viewer on either side of the device, the device will operate in the same manner as described in reference to FIG. 1. This is because the holographic structure optimised for operation in reflected light has negligible effect on the transmitted light. When the light source, transparent region and the observer are in alignment the transparent region appears uniformly transparent and the image is hidden (FIG. 10B). When the substrate is panned away from the light source the regions of the transparent region that contain the diffractive optical elements appear brightly illuminated but in contrast the non-deflecting region, transmitting ambient light, appears dark and the silhouette of the thread is revealed (FIG. 10C). When viewed in reflected light, from either side of the substrate, the silhouette of the thread disappears and the holographic image is visible over the whole surface of the transparent region (FIG. 10D).

FIGS. 11A-11D illustrate a security device with a similar two-sided structure to that described in FIG. 10 except that it additionally comprises a permanent image formed in a metallised layer 55 applied to the transparent substrate 31. In this example the metallised design is a fine line pattern. The first layer of embossing lacquer 32 is then applied onto the metallised layer 55 and the optical elements 33,34 subsequently embossed into the lacquer.

It is known that metallised films can be produced such that no metal is present in controlled and clearly defined areas. Such partly metallised film can be made in a number of ways. One way is to selectively demetallise regions using a resist and etch technique such as is described in U.S. Pat. No. 4,652,015. Other techniques are known for achieving similar effects; for example it is possible to vacuum deposit aluminium through a mask or aluminium can be selectively removed from a composite strip of a plastic support and aluminium using an excimer laser.

Figure 11:
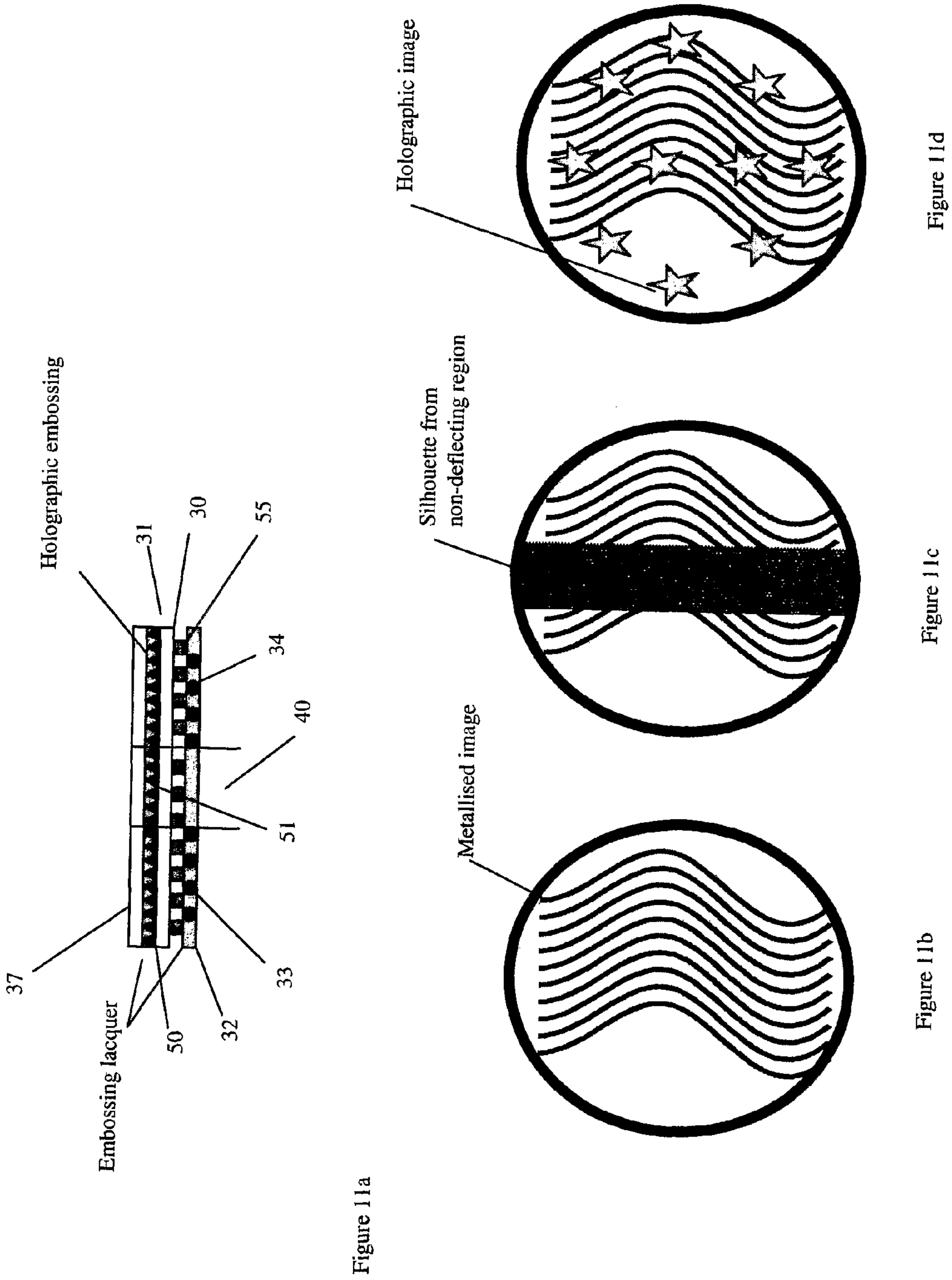

On holding the security device in FIG. 11 up to a backlight and panning from side to side the observer will observe the permanent metallised image and the appearance and disappearance of the silhouette image defined by the non-deflecting region (FIGS. 11B and 11C). When viewed in reflected light, from either side of the substrate, the silhouette disappears and the holographic image is revealed over the whole surface of the transparent region in combination with the permanent metallised image (FIG. 11D).

The security device in FIG. 11 offers three secure aspects; firstly a permanent image which is not light dependent, secondly a holographic image viewable only in reflected light and thirdly an optically variable image viewable only in transmitted light.

In all of the examples the non-deflecting region and the optical elements can be inversed such that the resultant silhouette defines the background and a negative image is created. Of course, one or more than two optical elements could be provided.

The invention claimed is:

1. A security device comprising:

a substrate having a transparent region, wherein:

at least one optical element comprising a diffraction grating is provided in part of the transparent region, the optical element causing an incident off-axis light beam incident on the device in a direction offset from a perpendicular to the plane of the substrate and transmitted through the optical element to be redirected away from a line parallel with the incident light beam whereby when the device is viewed in transmission directly against a backlight defined by a light beam of higher intensity than the ambient light level and which is in line with the device and the observer, the presence of the optical element cannot be discerned but when the device is moved relative to the backlight such that lines of sight from the viewer to the transparent region and from the transparent region to the backlight form an obtuse angle at which redirected light is visible to the viewer, a first contrast is viewed between the part of the transparent region including the optical element and another part of the transparent region, and when the security device is viewed in reflection under diffuse lighting conditions either no contrast can be discerned between the two parts or a second contrast, different from the first contrast, can be discerned between the two parts; and the security device further comprises an image, viewable in both reflection and transmission, on a part of the transparent region, the image being arranged at least partially over a portion of the at least one optical element.

2. A device according to claim 1, wherein the optical element is transparent to visible light.

3. A device according to claim 2, wherein more than one diffraction grating is provided in the said part of the transparent region, each diffraction grating having a similar structure.

4. A device according to claim 3, wherein the diffraction grating comprises a linear grating with a line density in the range 200-1500 lines/mm.

5. A device according to claim 1, wherein the or each diffraction grating is a linear diffraction grating.

6. A device according to claim 1, wherein the first contrast between the two parts defines a recognisable image.

7. A device according to claim 6, wherein the recognisable image comprises one or more alphanumeric characters, symbols, or graphical shapes.

8. A device according to claim 1, wherein the substrate comprises paper or polymer.

9. A device according to claim 1, wherein the or each optical element is adhered to the substrate.

10. A security document including a security device according to claim 1.

11. A security document according to claim 10, wherein a substrate of the security document provides the substrate of the security device.

12. A security document according to claim 10, the security document being one of a banknote, fiscal stamp, cheque, postal stamp, certificate of authenticity, brand protection article, bond or payment voucher.

13. The device according to claim 1, wherein the first contrast that is viewed between the part of the transparent region including the optical element and another part of the transparent region is in the plane of the transparent region, and wherein when the security device is viewed in reflection under diffuse lighting conditions either no contrast can be discerned between the two parts or the second contrast can be discerned between the two parts in the plane of the transparent region.

14. A device according to claim 1, wherein said part of the transparent region is separate from the optical element(s).

15. A device according to claim 1, wherein said part of the transparent region overlaps the at least one optical element.

16. A device according to claim 1, wherein said image is printed on said part of the transparent region.

17. A device according to claim 16, wherein the first contrast between the two parts defines a recognisable image, and wherein the printed image cooperates with the recognisable image formed by the first contrast between the two parts.

18. A device according to claim 1, wherein said image is defined by a metallisation on said part of said transparent region.

19. A method of validating a security device according to claim 1, the method comprising viewing a security document in transmission against a backlight brighter than ambient light; and panning the security device such that the device is viewed directly against the backlight and indirectly against the backlight in turn so as to determine whether the first contrast can be viewed between different parts of the transparent region.

20. A method of validating the security document of claim 10, the method comprising viewing the security document in transmission against a backlight brighter than ambient light; and panning the security device such that the device is viewed directly against the backlight and indirectly against the backlight in turn so as to determine whether the first contrast can be viewed between different parts of the transparent region.

21. A security device comprising:

a substrate having a transparent region, wherein:

at least one optical element comprising a diffraction grating is provided in part of the transparent region, the optical element causing an incident off-axis light beam incident on the device in a direction offset from a perpendicular to the plane of the substrate and transmitted through the optical element to be redirected away from a line parallel with the incident light beam whereby when the device is viewed in transmission directly against a backlight defined by a light beam of higher intensity than the ambient light level and which is in line with the device and the observer, the presence of the optical element cannot be discerned but when the device is moved relative to the backlight such that lines of sight from the viewer to the transparent region and from the transparent region to the backlight form an obtuse angle at which redirected light is visible to the viewer, a first contrast is viewed between the part of the transparent region including the optical element and another part of the transparent region; and when the security device is viewed in reflection under diffuse lighting conditions either no contrast can be discerned between the two parts or a second contrast, different from the first contrast, can be discerned between the two parts; and the security device further comprises a reflective based optical variable device including a diffractive or holographic device, in the transparent region, that is transparent when viewed in transmission directly against a back light but replays an image when viewed in reflection, the optical variable device being arranged at least partially over a portion of the at least one optical element.

22. A device according to claim 21, wherein the reflective based optical variable device extends over the at least one optical element.

23. A device according to claim 21, wherein the reflective based optical variable device is laterally offset from the at least one optical element.

24. A device according to claim 23, wherein the reflective based optical variable device is provided in said another part of the transparent region.

25. A device according to claim 21, wherein the reflective based optical variable device is provided on one side of the substrate and the optical element(s) on the opposite side of the substrate.

26. A device according to claim 21, wherein the reflective based optical variable device includes a high refractive index layer.

27. A device according to claim 21, wherein the or each optical element and/or the diffractive or holographic device is embossed into the substrate.

28. A device according to claim 21, wherein the optical element(s) and/or the reflective based optical variable device is embossed into a lacquer on the substrate.

29. A device according to claim 28, wherein the lacquer is provided directly on the substrate surface.

30. A device according to claim 28, wherein the reflective based optical variable device is provided on one side of the substrate and the optical element(s) on the opposite side of the substrate, wherein lacquer layers are provided on opposite sides of the substrate, the optical element(s) being embossed in one of the lacquer layers and the reflective based optical variable device being embossed in the other lacquer layer.

31. A device according to claim 30, further comprising an image, viewable in both reflection and transmission, on a part of the transparent region, wherein said image is located between the substrate and one of the lacquer layers.

* * * * *